United States Patent
Ly et al.

(10) Patent No.: US 10,862,639 B2
(45) Date of Patent: Dec. 8, 2020

(54) DECOUPLING OF SYNCHRONIZATION RASTER AND CHANNEL RASTER

(71) Applicant: QUALCOMM Incorporated, San Diego, CA (US)

(72) Inventors: Hung Ly, San Diego, CA (US); Wanshi Chen, San Diego, CA (US); Heechoon Lee, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 15/802,181

(22) Filed: Nov. 2, 2017

(65) Prior Publication Data

US 2018/0131487 A1 May 10, 2018

Related U.S. Application Data

(60) Provisional application No. 62/417,993, filed on Nov. 4, 2016.

(51) Int. Cl.
  H04L 5/00 (2006.01)
  H04W 56/00 (2009.01)
  H04W 72/04 (2009.01)

(52) U.S. Cl.
  CPC .......... *H04L 5/0048* (2013.01); *H04L 5/0053* (2013.01); *H04W 56/001* (2013.01);
  (Continued)

(58) Field of Classification Search
  CPC ... H04L 5/0048; H04L 5/0053; H04L 5/0007; H04L 5/0055; H04L 5/0051;
  (Continued)

(56) References Cited

U.S. PATENT DOCUMENTS

| 2010/0027492 A1* | 2/2010 | Asanuma | H04L 5/0007 370/329 |
| 2015/0341957 A1* | 11/2015 | Tang | H04W 72/1289 370/329 |

(Continued)

OTHER PUBLICATIONS

Huawei et al., "Channel Raster and Synchronization Signal Locations", 3GPP Draft; R1-1608847, 3rd Generation Partnership Project (3GPP), Mobile Competence Centre, 650, Route Des Lucioles, F-06921 Sophia-Antipolis Cedex, France, vol. RAN WG1, No. Lisbon, Portugal; Oct. 9, 2016, XP051148901, Retrieved from the Internet: URL:http://www.3gpp.org/ftp/Meetings_3GPP_SYNC/ RAN1/Docs/ [retrieved on Oct. 9, 2016], 3 pages.

(Continued)

*Primary Examiner* — Hassan Kizou
*Assistant Examiner* — Abdullahi Ahmed
(74) *Attorney, Agent, or Firm* — Kevin M. Donnelly; Arent Fox, LLP

(57) ABSTRACT

A method and apparatus for decoupling of a synchronization ("sync") channel raster and a channel raster in a wireless communication system is disclosed. For example, the method and apparatus include determining, at a network entity, a synchronization channel raster corresponding to a set of frequencies, and transmitting, from the network entity, one or more synchronization signals and a physical broadcast channel (PBCH) in any frequency of the set of frequencies of the synchronization channel raster to at least one UE. For example, the method and apparatus further include determining, at a network entity, a synchronization channel raster corresponding to a set of frequencies, and transmitting, from the network entity, one or more synchronization signals and a PBCH in a frequency of the set of frequencies of the synchronization channel raster closest to a center frequency of a bandwidth to at least one UE.

34 Claims, 7 Drawing Sheets

(52) U.S. Cl.
CPC ........... *H04W 72/042* (2013.01); *H04L 5/001* (2013.01); *H04L 5/0007* (2013.01); *H04L 5/0051* (2013.01); *H04L 5/0055* (2013.01); *H04L 5/0057* (2013.01)

(58) Field of Classification Search
CPC .... H04L 5/0057; H04L 5/001; H04W 56/001; H04W 72/042
See application file for complete search history.

(56) References Cited

U.S. PATENT DOCUMENTS

| | | | |
|---|---|---|---|
| 2017/0251443 A1* | 8/2017 | Shin | H04W 56/0015 |
| 2018/0124744 A1* | 5/2018 | Xue | H04L 5/0094 |
| 2019/0182784 A1* | 6/2019 | Harada | H04W 56/001 |

OTHER PUBLICATIONS

Partial International Search Report—PCT/US2017/059975—ISA/EPO—Feb. 14, 2018.

Qualcomm Incorporated: "DL Control Channels Overview", 3GPP Draft; R1-1610177, 3rd Generation Partnership Project (3GPP), Mobile Competence Centre, 650, Route Des Lucioles, F-06921 Sophia-Antipolis Cedex, France, vol. RAN WG1, No. Lisbon, Portugal; Oct. 9, 2016, XP051150197, Retrieved from the Internet: URL:http://www.3gpp.org/ftp/Meetings_3GPP_SYNC/RAN1/Docs/ [retrieved on Oct. 9, 2016], 6 pages.

Qualcomm Incorporated: "Single Beam Synchronization Design", 3GPP Draft; R1-1610156, Single Beam Sync Design, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; 20160910-20160914, Oct. 9, 2016 (Oct. 9, 2016), XP051150179, 6 Pages, Retrieved from the Internet: URL: http://www.3gpp.org/ftp/Meetings_3GPP_SYNC/RAN1/Docs/ [retrieved on Oct. 9, 2016].

Qualcomm Incorporated: "Minimum System Bandwidth for MMW", 3GPP Draft; R1-1612020, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 13, 2016, XP051175983, Retrieved from the Internet: URL:http://www.3gpp.org/ftp/Meetings_3GPP_SYNC/RAN1/Docs/ [retrieved on Nov. 13, 2016], 3 pages.

International Search Report and Written Opinion—PCT/US2017/059975—ISA/EPO—Apr. 16, 2018 19 pages.

\* cited by examiner

US 10,862,639 B2

DECOUPLING OF SYNCHRONIZATION RASTER AND CHANNEL RASTER

CLAIM OF PRIORITY UNDER 35 U.S.C. § 119

The present Application for Patent claims priority to U.S. Provisional Application No. 62/417,993 entitled "DECOUPLING OF SYNCHRONIZATION RASTER AND CHANNEL RASTER" filed Nov. 4, 2016, which is assigned to the assignee hereof and hereby expressly incorporated by reference herein.

BACKGROUND

Aspects of the present disclosure relates generally to communication systems, and more particularly, to decoupling of a synchronization ("sync") channel raster and a channel raster in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, wideband CDMA (W-CDMA) systems, time division multiple access (TDMA) systems, frequency division multiple access (FDMA) systems, orthogonal frequency division multiple access (OFDMA) systems, wide band single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

During initial acquisition at a user equipment (UE) in long term evolution (LTE) networks, the UE performs a frequency scan first. The UE searches for a carrier center frequency by scanning through configured frequency bands. For a given frequency band and a channel raster (e.g., 100 kHz in LTE), the UE may detect a set of center frequency candidates (e.g., by a downlink power spectrum measurement or waveform detection) over which the synchronization signals could be detected. However, such frequency scan procedure has some drawbacks in NR networks. For example, as NR is expected to be deployed in wide frequency bands, frequency scanning using the channel raster is not efficient. Further, there may be confusion between NR/LTE networks, as both NR and LTE employ OFDM based waveforms in the downlink. Furthermore, "alien" waveform confusion may occur when some massive Machine Type Communications (mMTC) waveforms or some on-demand signals exist in the frequency band.

Therefore, for NR communications technology and beyond (and with Long Term Evolution (LTE) communications technology), improvements in decoupling the synchronization channel raster and the channel raster may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for decoupling of a synchronization channel raster and a channel raster for wireless communications. The described aspects include determining, at a network entity, a synchronization channel raster corresponding to a set of frequencies. The described aspects further include transmitting, from the network entity, one or more synchronization signals and a physical broadcast channel (PBCH) in any frequency of the set of frequencies of the synchronization channel raster to at least one user equipment (UE).

In an aspect, an apparatus, such as a network entity, for decoupling of a synchronization channel raster and a channel raster for wireless communications may include a transceiver, a memory, and at least one processor coupled with the memory and configured to determine, at the network entity, a synchronization channel raster corresponding to a set of frequencies. The described aspects further transmit, from the network entity, one or more synchronization signals and a PBCH in any frequency of the set of frequencies of the synchronization channel raster to at least one UE.

In an aspect, a computer-readable medium may store computer executable code for decoupling of a synchronization channel raster and a channel raster for wireless communications is described. The described aspects include code for determining, at a network entity, a synchronization channel raster corresponding to a set of frequencies. The described aspects further include code for transmitting, from the network entity, one or more synchronization signals and a PBCH in any frequency of the set of frequencies of the synchronization channel raster to at least one UE.

In an aspect, an apparatus for decoupling of a synchronization channel raster and a channel raster for wireless communications is described. The described aspects include means for determining, at a network entity, a synchronization channel raster corresponding to a set of frequencies. The described aspects further include means for transmitting, from the network entity, one or more synchronization signals and a PBCH in any frequency of the set of frequencies of the synchronization channel raster to at least one UE.

In accordance with an aspect, a method for decoupling of a synchronization channel raster and a channel raster for wireless communications. The described aspects include detecting, at a UE, one or more synchronization signals for timing and frequency synchronization with a network entity and a physical cell identifier (ID) for each frequency of a synchronization channel raster. The described aspects further include retrieving, at the UE, a master information block (MIB) by decoding a PBCH transmitted from the network entity. The described aspects further include searching, by the UE, for a center frequency based at least on detecting the one or more synchronization signals and retrieving the MIB.

In an aspect, an apparatus, such as a UE, for decoupling of a synchronization channel raster and a channel raster for wireless communications may include a transceiver, a memory, and at least one processor coupled with the memory and configured to detect, at a UE, one or more synchronization signals for a timing and a frequency synchronization with a network entity and a physical cell ID for each frequency of a synchronization channel raster. The described aspects further retrieve, at the UE, a MIB by decoding a PBCH transmitted from the network entity. The described aspects further search, by the UE, for a center frequency based at least on detecting the one or more synchronization signals and retrieving the MIB.

In an aspect, a computer-readable medium may store computer executable code for decoupling of a synchronization channel raster and a channel raster for wireless communications is described. The described aspects include code for detecting, at a UE, one or more synchronization signals for a timing and a frequency synchronization with a network entity and a physical cell ID for each frequency of a synchronization channel raster. The described aspects further include code for retrieving, at the UE, a MIB by decoding a PBCH transmitted from the network entity. The described aspects further include code for searching, by the UE, for a center frequency based at least on detecting the one or more synchronization signals and retrieving the MIB.

In an aspect, an apparatus for decoupling of a synchronization channel raster and a channel raster for wireless communications is described. The described aspects include means for detecting, at a UE, one or more synchronization signals for a timing and a frequency synchronization with a network entity and a physical cell ID for each frequency of a synchronization channel raster. The described aspects further include means for retrieving, at the UE, a MIB by decoding a PBCH transmitted from the network entity. The described aspects further include means for searching, by the UE, for a center frequency based at least on detecting the one or more synchronization signals and retrieving the MIB.

In accordance with an aspect, a method for decoupling of a synchronization channel raster and a channel raster for wireless communications. The described aspects include determining, at a network entity, a synchronization channel raster corresponding to a set of frequencies. The described aspects further include transmitting, from the network entity, one or more synchronization signals and a PBCH in a frequency of the set of frequencies of the synchronization channel raster closest to a center frequency of a bandwidth to at least one UE.

In an aspect, an apparatus, such as a network entity, for decoupling of a synchronization channel raster and a channel raster for wireless communications may include a transceiver, a memory, and at least one processor coupled with the memory and configured to determine, at the network entity, a synchronization channel raster corresponding to a set of frequencies. The described aspects further transmit, from the network entity, one or more synchronization signals and a PBCH in a frequency of the set of frequencies of the synchronization channel raster closest to a center frequency of a bandwidth to at least one UE.

In an aspect, a computer-readable medium may store computer executable code for decoupling of a synchronization channel raster and a channel raster for wireless communications is described. The described aspects include code for determining, at a network entity, a synchronization channel raster corresponding to a set of frequencies. The described aspects further include code for transmitting, from the network entity, one or more synchronization signals and a PBCH in a frequency of the set of frequencies of the synchronization channel raster closest to a center frequency of a bandwidth to at least one UE.

In an aspect, an apparatus for decoupling of a synchronization channel raster and a channel raster for wireless communications is described. The described aspects include means for determining, at a network entity, a synchronization channel raster corresponding to a set of frequencies. The described aspects further include means for transmitting, from the network entity, one or more synchronization signals and a PBCH in a frequency of the set of frequencies of the synchronization channel raster closest to a center frequency of a bandwidth to at least one UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
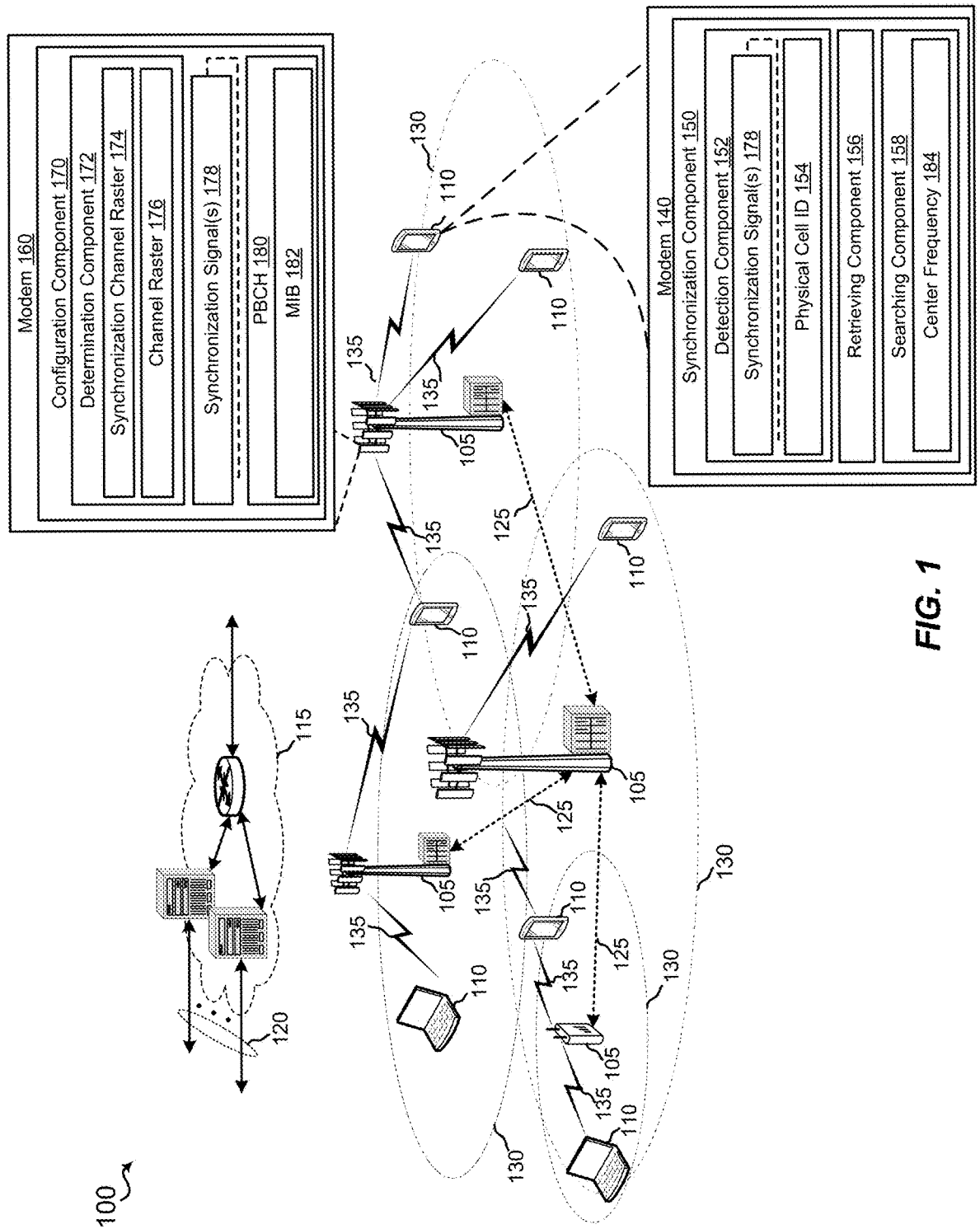
FIG. 1 is a schematic diagram of an example of a wireless communication network including at least one base station having a configuration component and at least one UE having a synchronization component.
Figure 2:
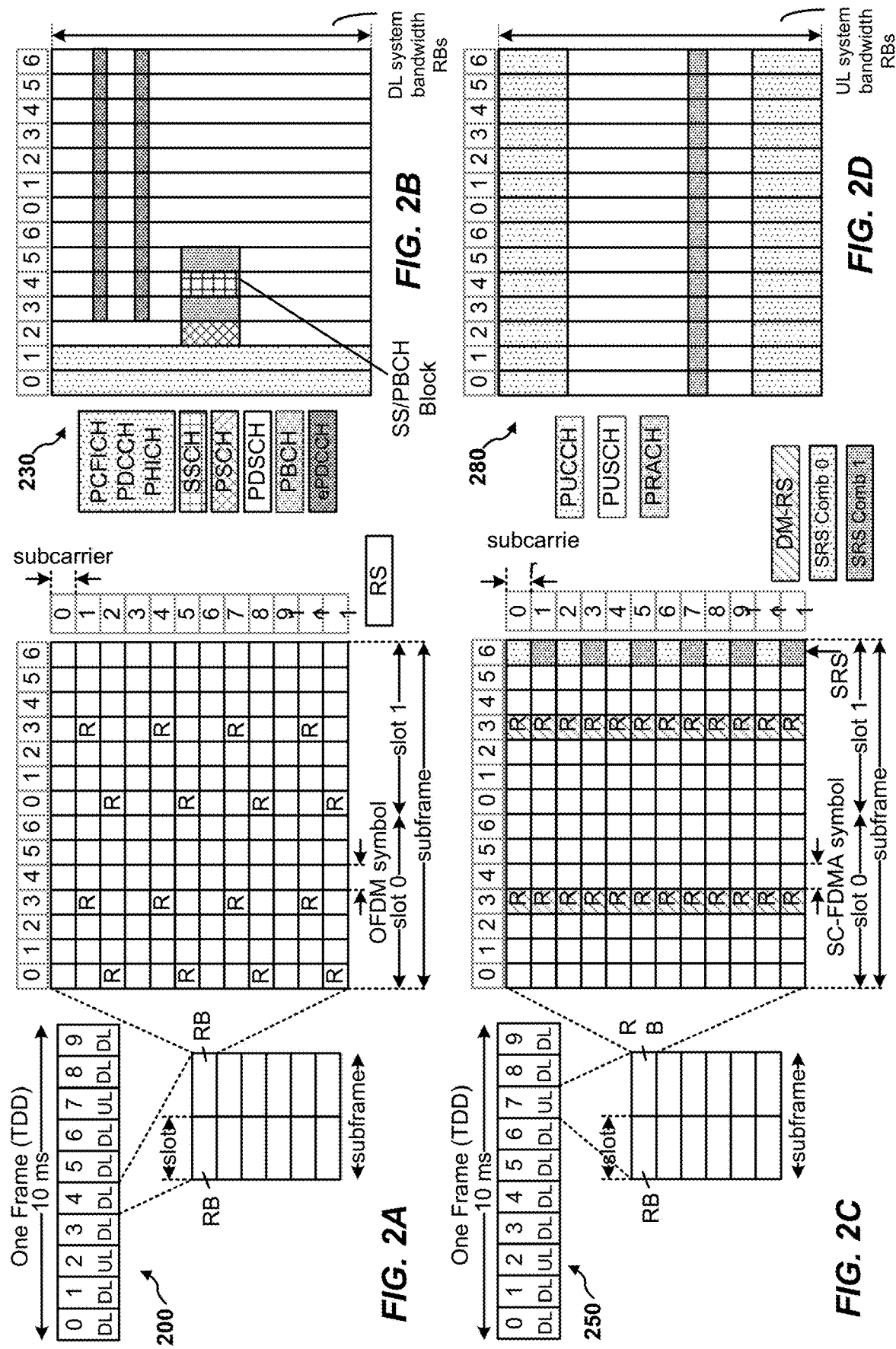
FIG. 2A is a diagram illustrating an example of a downlink (DL) subframe for a 5G/NR frame structure.
FIG. 2B is a diagram illustrating an example of a DL channels within the DL subframe for a 5G/NR frame structure.
FIG. 2C is a diagram illustrating an example of an uplink (UL) subframe for a 5G/NR frame structure.
FIG. 2D is a diagram illustrating an example of a UL channels within the UL subframe respectively, for a 5G/NR frame structure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure provides an example method and apparatus for decoupling of a synchronization channel raster and a channel raster for wireless communications. For example, during initial acquisition at a UE in LTE networks, the UE initially performs a frequency scan by searching for a carrier center frequency by scanning through configured frequency bands. For a given frequency band and a channel raster (e.g., 100 kHz in LTE), the UE may detect a set of center frequency candidates (e.g., by a downlink power spectrum measurement or waveform detection) over which the synchronization signals can be detected. However, such a frequency scan procedure has some drawbacks in NR networks. For example, as NR is expected to be deployed in wide frequency bands, frequency scanning using the channel raster is not efficient. Further, there may be confusion between NR/LTE networks, as both NR and LTE employ OFDM based waveforms in the downlink. Furthermore, "alien" waveform confusion may occur when some massive Machine Type Communications (mMTC) waveforms or some on-demand signals exist in the frequency band.

The present disclosure introduces an efficient frequency scan procedure by decoupling the channel raster and the synchronization channel raster. In an aspect, a channel raster of 100 kHz indicates that the carrier frequency is a multiple of 100 kHz. Similarly, a synchronization raster of 2 MHz indicates the frequency of the synchronization channel is a multiple of 2 MHz. For example, in an aspect, the channel raster for a NR below 6 GHz ("Sub6") may be similar to LTE channel raster (e.g., 100 kHz) to provide deployment flexibility. The synchronization channel raster is much coarser (e.g., wider in bandwidth) than the channel raster to reduce the complexity of the frequency scan and achieve faster detection. In one implementation, the synchronization channel raster may be a multiple of a least common multiple of the channel raster and reference resource block (RB) bandwidth so as to allow for faster alignment of the synchronization channel raster with both the channel raster and the RB.

The present disclosure provides an example method and an apparatus for decoupling of a synchronization channel raster and a channel raster that may include determining, at a network entity, a synchronization channel raster corresponding to a set of frequencies, and transmitting, from the network entity, one or more synchronization signals and a PBCH in any frequency of the set of frequencies of the synchronization channel raster to at least one UE. The present disclosure provides another method and apparatus for detecting, at a UE, one or more synchronization signals for timing and frequency synchronization with a network entity and a physical cell identifier (ID) for each frequency of a synchronization channel raster, retrieving, at the UE, a MIB by decoding a PBCH transmitted from the network entity, and searching, by the UE, for a center frequency based at least on detecting the one or more synchronization signals and retrieving the MIB. The present disclosure provides another method and apparatus for determining, at a network entity, a synchronization channel raster corresponding to a set of frequencies, and transmitting, from the network entity, one or more synchronization signals and a PBCH in a frequency of the set of frequencies of the synchronization channel raster closest to a center frequency of a bandwidth to at least one.

Additional features of the present aspects are described in more detail below with respect to FIGS. 1-7.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example of a wireless communication network 100 including at least one UE 110 and at least one base station 105. The UE 110 may include a modem 140 having a synchronization component 150 configured to perform frequency scanning by decoupling of a synchronization channel raster 174 and a channel raster 176. Further, the wireless communication network 100 includes at least one base station 105 with a modem 160 having a configuration component 170 configured to transmit one or more synchronization signals 178 and a PBCH 180.

In an aspect, the base station 105 and/or configuration component 170 may include a determination component 172 configured to determine a synchronization channel raster 174 corresponding to a set of frequencies. For example, determination component 172 may determine the synchronization channel raster 174 based at least on a least common multiple (LCM) of a channel raster 176 and a reference resource block (RB) bandwidth.

In an aspect, a master information block (MIB) 182 of the PBCH 180 includes a first portion of bits indicating a common control subband for carrying minimum system information block (MSIB) scheduling information. The common control subband may correspond to a common search space of a physical downlink control channel (PDCCH). Further, wherein the MSIB scheduling information may include at least one of a location information corresponding to a frequency of the set of frequencies of the synchronization channel raster 174 where the one or more synchronization signals are transmitted, a numerology, and a bandwidth. In another example, the MIB includes a second portion of bits indicating a location of a center frequency 184.

In another aspect, a first portion of bits of a MIB 182 of the PBCH 180 indicate a location of the center frequency 184 of the bandwidth in relation to a location of the frequency of the set of frequencies of the synchronization channel raster 174. For example, the MIB 182 includes a common control subband for carrying MSIB scheduling information. The common control subband may be symmetrically located to the center frequency 184 of the bandwidth. The common control subband may correspond to a common search space PDCCH. Further, the MIB 182 may include a common control subband bandwidth and a common control subband numerology.

In another aspect, the MIB 182 includes a common control subband for carrying MSIB scheduling information. For example, the common control subband may be symmetrically located at any frequency of the bandwidth. Further, a second portion of bits of the MIB 182 indicates at least one of a location of the common control subband in relation to a location of the frequency of the set of frequencies of the synchronization channel raster 174, a common control subband bandwidth, and a common control subband numerology. The common control subband may correspond to a common search space of the PDCCH.

In an aspect, the base station 105 and/or configuration component 170 may transmit one or more synchronization signals 178 and a PBCH 180 in any frequency of the set of frequencies of the synchronization channel raster 174 to at least one UE 110.

In another aspect, the base station 105 and/or configuration component 170 may transmit one or more synchronization signals 178 and a PBCH 180 in a frequency of the set of frequencies of the synchronization channel raster 174 closest to a center frequency 184 of a bandwidth to at least one UE 110.

In an aspect, the UE 110 and/or synchronization component 150 may include a detection component 152, which may be configured to detect one or more synchronization signals 178 for timing and frequency synchronization with a network entity and a physical cell ID 154 for each frequency of a synchronization channel raster 174. For example, the synchronization channel raster corresponds to a LCM of a channel raster 176 and a reference RB bandwidth.

In an aspect, the UE 110 and/or synchronization component 150 may include a retrieving component 156 configured to retrieve a MIB 182 by decoding a PBCH 180 transmitted from the base station 105. For example, the MIB 182 includes a first portion of bits indicating a common control subband for carrying MSIB scheduling information. The common control subband corresponds to a common search space of the PDCCH. Further, the MSIB scheduling information includes at least one of a location information corresponding to a frequency of the set of frequencies of the synchronization channel raster 174 where the one or more synchronization signals are transmitted, a numerology, and a bandwidth. In an example, the MIB 182 includes a second portion of bits indicating a location of the center frequency 184.

In an aspect, the UE 110 and/or synchronization component 150 may include a searching component 158, which may be configured to search for a center frequency 184 based at least on detecting the one or more synchronization signals 178 and retrieving the MIB 182.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

The UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave or MMW) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^\mu * 15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
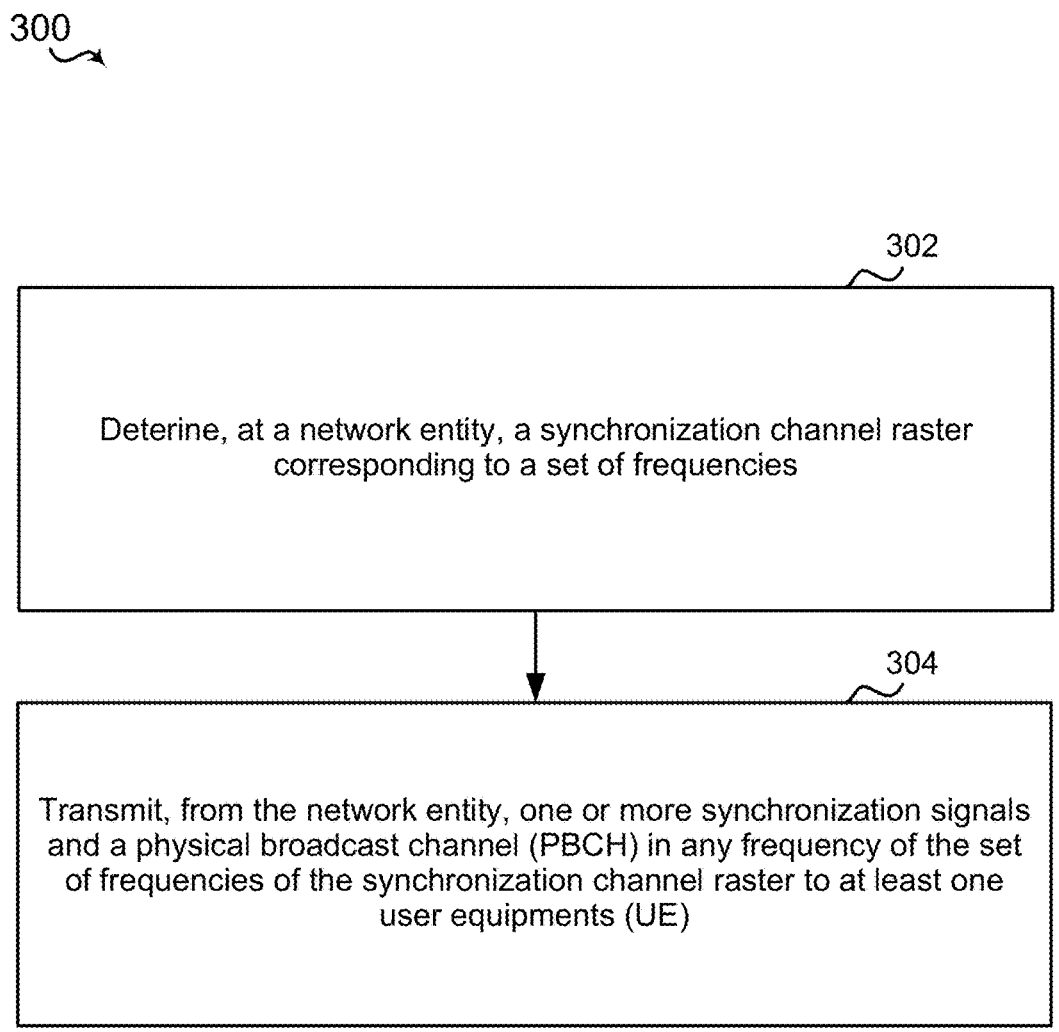
FIG. 3 is a flow diagram of an example of a method for decoupling of a synchronization channel raster and a channel raster for wireless communications at a network entity.

Referring to FIG. 3, for example, a method 300 of wireless communication at the base station 105 according to the above-described aspects to decouple of a synchronization channel raster 174 and a channel raster 176 in a wireless communication system includes one or more of the herein-defined actions.

At block 302, the method 300 may determine, at a network entity, a synchronization channel raster corresponding to a set of frequencies. For example, the base station 105 and/or the configuration component 170 may execute the determination component 172 to determine a synchronization channel raster 174 corresponding to a set of frequencies. The determination component 172 may determine the synchronization channel raster 174 based at least on a LCM of a channel raster 176 and a reference RB bandwidth. In an example, the determination component 172 may configure a channel raster 176 to 100 kHz, with a reference RB bandwidth of 180 kHz. The determination component 172 may determine the synchronization channel raster 174 as a multiple of LCM of the channel raster 176 and the reference RB bandwidth. For example, $$\text{Synchronization Channel Raster} = K *$$
$$(LCM(\text{Channel Raster, Reference } RB \text{ bandwidth}) = K * 900 = 1.8 \text{ MHz}$$

when Channel Raster=100 kHZ, and Reference RB bandwidth=180 kHz, and the value of a scaling factor "K" being set to a value of 2.

At block 304, the method 300 may transmit, from the network entity, one or more synchronization signals and a PBCH in any frequency of the set of frequencies of the synchronization channel raster to at least one UE. For example, the base station 105 and/or the configuration component 170 may transmit one or more synchronization signals 178 and a PBCH 180 in any frequency of the set of frequencies of the synchronization channel raster 174 to at least one UE 110. In an example, the base station 105 and/or the configuration component 170 may transmit one or more synchronization signals 178 (e.g., primary and secondary synchronization signals) and a PBCH 180 in any multiple of a frequency of the synchronization channel raster 174 (e.g., 1.8 MHz, 3.6 MHz, etc.) to one or more UEs, e.g., UE 110.

In an aspect, the base station 105 and/or the configuration component 170 may transmit the synchronization signals 178 and the PBCH 180 in any synchronization channel raster frequency (i.e., any multiple of the synchronization channel raster 174). Further, a number of bits (e.g., "X" number of bits) of a MIB 182 may be used to indicate common control sub-band (e.g., common search space PDCCH) which carries a MSIB scheduling, for example, location with respect to the synchronization channel raster frequency where synchronization signals 178 are transmitted, numerology (e.g., subcarrier spacing, symbol times, FFT sizes, etc.), and bandwidth. Additionally, if the UE 110 needs the center frequency 184 of the system bandwidth, then the "Y" bits of the MSIB may be used to indicate the center frequency 184 location.

Figure 4:
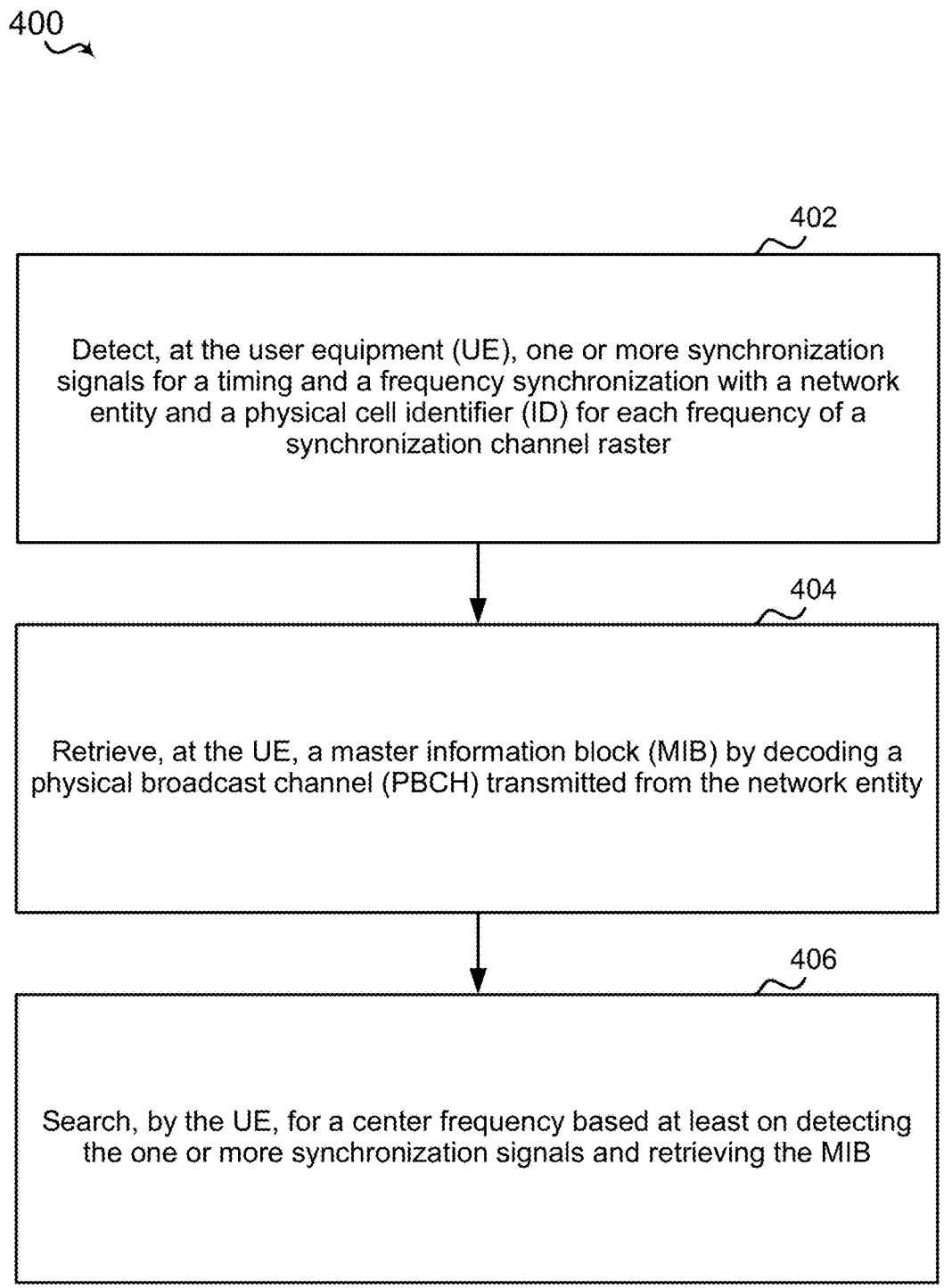
FIG. 4 is a flow diagram of an example of a method for decoupling of a synchronization channel raster and a channel raster for wireless communications at a UE.

Referring to FIG. 4, for example, a method 400 of wireless communication at the UE 110 according to the above-described aspects to decouple of a synchronization channel raster 174 and a channel raster 176 in a wireless communication system includes one or more of the herein-defined actions.

At block 402, the method 400 may detect, at a UE, one or more synchronization signals for timing and frequency synchronization with a network entity and a physical cell ID for each frequency of a synchronization channel raster. For example, the UE 110 and/or the synchronization component 150 may execute the detection component 152 to detect one or more synchronization signals 178 for timing and frequency synchronization with a base station 105 and a physical cell ID 154 for each frequency of a synchronization channel raster 174. In an example, the physical cell ID 154 may have a range of 0 to 503 and may be used to scramble the data so that the UE 110 may separate information from the different transmitters. A physical cell ID 154 may determine the primary and secondary synchronization signal sequence transmitted from the base station 105.

At block 404, the method 400 may retrieve, at the UE, a MIB by decoding a PBCH transmitted from the network entity. For example, the UE 110 and/or the synchronization component 150 may execute the retrieving component 156 to retrieve a MIB 182 by decoding a PBCH 180 transmitted from the base station 105.

At block 406, the method 400 may search, by the UE, for a center frequency based at least on detecting the one or more synchronization signals and retrieving the MIB. For example, the UE 110 and/or the synchronization component 150 may execute the searching component 158 to search for a center frequency 184 based at least on detecting the one or more synchronization signals 178 and retrieving the MIB 182.

Figure 5:
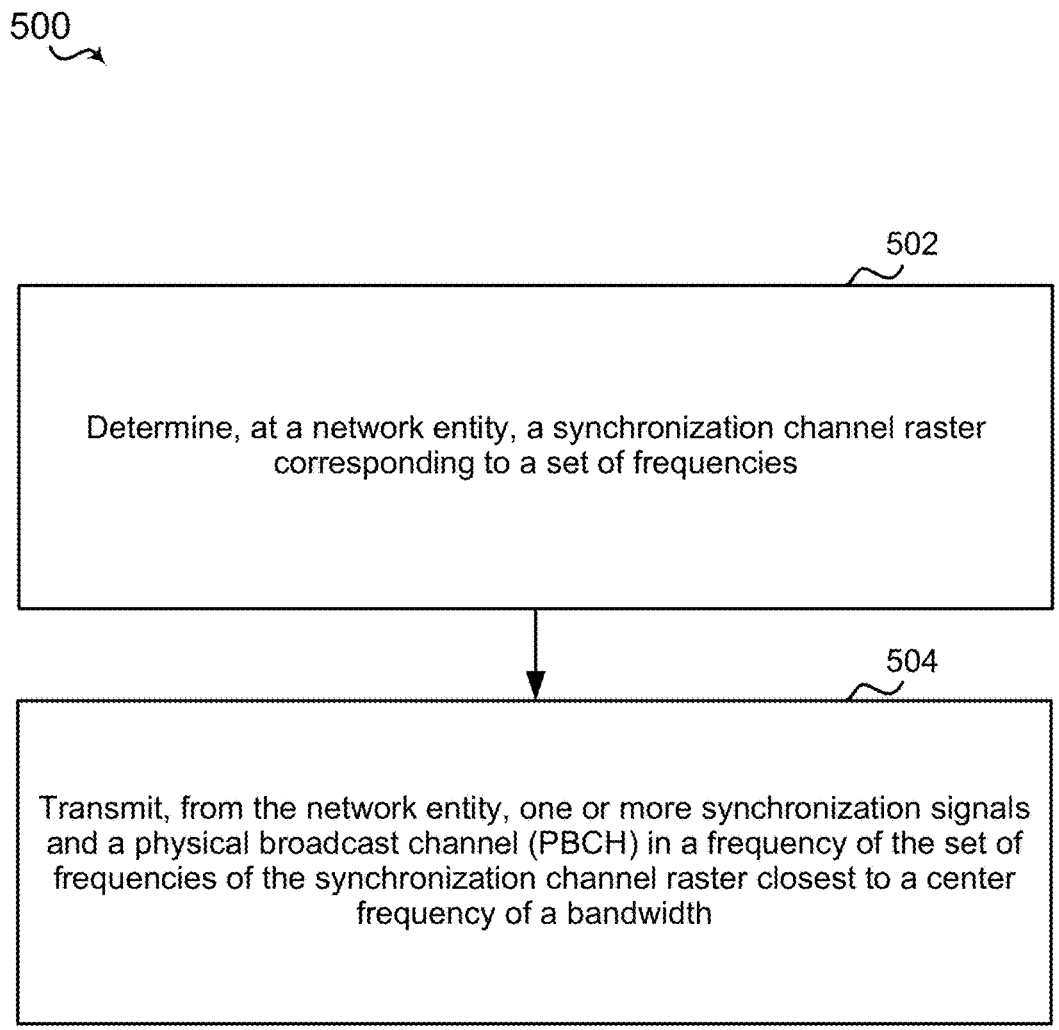
FIG. 5 is a flow diagram of another example of a method for decoupling of a synchronization channel raster and a channel raster for wireless communications at a network entity.

Referring to FIG. 5, for example, a method 500 of wireless communication at the base station 105 according to the above-described aspects to decouple of a synchronization channel raster 174 and a channel raster 176 in a wireless communication system includes one or more of the herein-defined actions.

At block 502, the method 300 may determine, at a network entity, a synchronization channel raster corresponding to a set of frequencies. For example, the base station 105 and/or the configuration component 170 may execute the determination component 172 to determine a synchronization channel raster 174 corresponding to a set of frequencies. For example, the determination component 172 may configure a channel raster 176 to 100 kHz, with a reference RB bandwidth of 180 kHz. The determination component 172 may determine the synchronization channel raster 174 as a multiple of LCM of the channel raster 176 and the reference RB bandwidth. For example, $$\text{Synchronization Channel Raster} = K *$$
$$(LCM(\text{Channel Raster, Reference } RB \text{ bandwidth}) = K * 900 = 1.8 \text{ MHz}$$

when Channel Raster=100 kHZ, and Reference RB bandwidth=180 kHz, and the value of a scaling factor "K" being set to a value of 2.

At block 504, the method 500 may transmit, from the network entity, one or more synchronization signals and a PBCH in a frequency of the set of frequencies of the synchronization channel raster closest to a center frequency of a bandwidth to at least one UE. For example, the base station 105 and/or the configuration component 170 may transmit one or more synchronization signals 178 and a PBCH 180 in a frequency of the set of frequencies of the synchronization channel raster 174 closest to a center frequency 184 of a bandwidth to at least one UE 110.

In an aspect, the synchronization signals 178 and the PBCH 180 may be transmitted in the synchronization channel raster frequency closest to the center frequency 184. A number of bits (e.g., "X" number of bits) in the MIB 182 may be used to indicate the center frequency 184 location with respect to the synchronization channel raster frequency where synchronization signals 178 are transmitted. For example, if the synchronization channel raster 174 is 1.8 MHz, five bits may be used to signal the center frequency 184 location in steps of the channel raster 176, e.g., 100 kHz. Additionally, common control sub-band (e.g., common search space PDCCH) carrying MSIB scheduling is symmetric around the center frequency 184, and common control sub-band (e.g., common search space PDCCH) bandwidth and numerology may be signaled in the MIB 182.

In an aspect, the synchronization signals 178 and the PBCH 180 may be transmitted in the synchronization channel raster 174 closest to the center frequency 184. A number of bits (e.g., "X" number of bits) in the MIB 182 may be used to indicate the center frequency 184 location with respect to the synchronization channel raster frequency where synchronization signals 178 are transmitted. For example, if the synchronization channel raster 174 is 1.8 MHz, five bits may be used to signal the center frequency 184 location in steps of the channel raster 176 (e.g., 100 kHz). Additionally, common control sub-band (e.g., common search space PDCCH) carrying MSIB scheduling can be present anywhere in the system bandwidth, and a "Y" number of bits in the MIB 182 may be used to indicate common control sub-band (e.g., search space PDCCH) carrying MSIB scheduling location with respect to the synchronization channel raster frequency where synchronization signals 178 are transmitted, numerology, and bandwidth.

Additionally, the synchronization channel raster 174 may be defined as a function of the channel raster 176. The channel raster 176 is for the center frequency 184 placement and signaling granularity of the synchronization channel raster offset to the center frequency 184. The channel raster 176 may be assumed to be 100 kHz (similar to LTE). The synchronization channel raster 174 may be signaled by steps of the channel raster 176. If the synchronization channel raster 174 is 1.8 MHz and the channel raster 176 is 100 kHz, 5 bits are needed for synchronization raster offset to the center frequency 184, and the synchronization signals 178 are transmitted in the synchronization channel raster point closest to the center frequency 184 to minimize signaling of the synchronization offset to the center frequency 184.

A guard around the synchronization channel raster 174 may be needed to minimize interference. In one example, the guard may be dimensioned in neighboring RBs used for data or control channels. That is, data may be only mapped into the upper half of the edge data RB. In another example, the guard may be dimensioned in edge synchronization tones of the edge sync RBs. For instance, 7 RBs (2.52 MHz) may be required and 72 middle tones may be used for synchronization. The number of left-over tones in fractional neighboring data RBs on tone spacing of such RBs. In an aspect, a synchronization channel raster 174 of 1.8 MHz may support subcarrier spacing (SCC) of 15/30 kHz for data/control channels. That is, 60 kHz RB=720 kHz. If the channel raster 176 is 100 kHz, LCM (720, 100)=3.6 MHz, which does not provide sufficient resources for synchronization.

In an additional aspect, only 15 kHz and 30 kHz subcarrier spacing (SCS) may be supported for data/control channels. However, symbols that do not carry synchronization channels may not have this feature. Further, time division multiplexing (TDM) may be used if the synchronization channel raster 174 is employed, specifically, when the synchronization bandwidth is at the edge of the channel bandwidth as blind detection for the other synchronization sub-bands may be needed after the primary synchronization signal (PSS) is detected.

In an additional aspect, for intra frequency downlink measurement, the UE 110 may assume the frequency location of the synchronization signal(s) among neighbor cells and the UE 110 may also assume that the neighbor cells may have measurement signals of minimum bandwidth or synchronization bandwidth. Additionally, the UE 110 may assume that neighbor cells may have measurements signals of minimum bandwidth or synchronization bandwidth, or the base station 105 may signal the measurement signal bandwidth of the inter-frequency neighbor cells.

Figure 6:
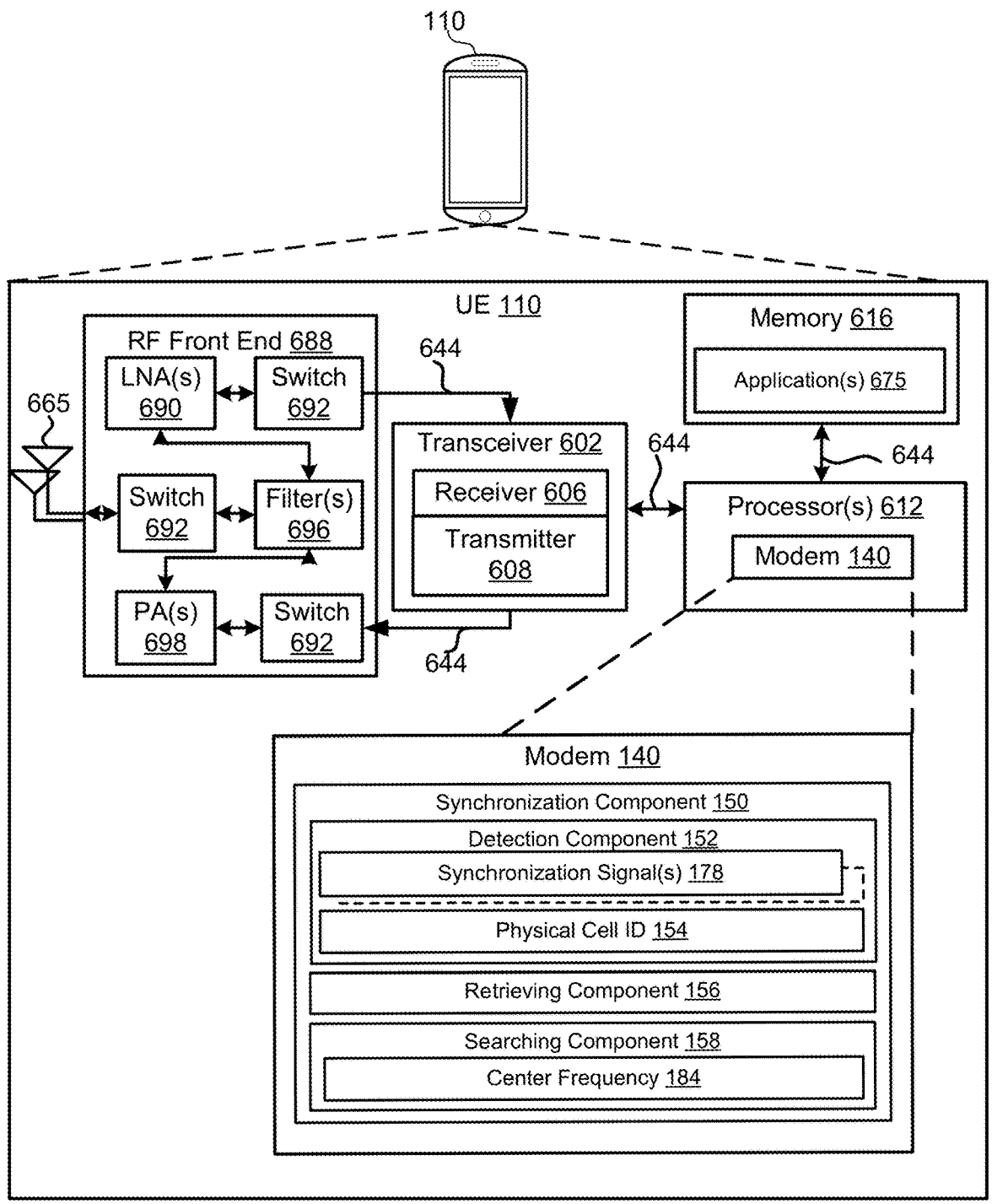
FIG. 6 is a schematic diagram of example components of the UE of FIG. 1.

Referring to FIG. 6, one example of an implementation of an UE 110 may include a variety of components, some of which have already been described above, but including components such as one or more processors 612 and memory 616 and transceiver 602 in communication via one or more buses 644, which may operate in conjunction with modem 140 and synchronization component 150. Further, the one or more processors 612, modem 140, memory 616, transceiver 602, radio frequency (RF) front end 688 and one or more antennas 665, may be configured to support voice and/or data calls (simultaneously or non-simultaneously) in one or more radio access technologies. In some aspects, the modem 140 may be the same as or similar to the modem 140 (FIG. 1).

In an aspect, the one or more processors 612 can include a modem 140 that uses one or more modem processors. The various functions related to synchronization component 150 may be included in modem 140 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 140 associated with synchronization component 150 may be performed by transceiver 602.

Also, the memory 616 may be configured to store data used herein and/or local versions of applications 675 or synchronization component 150 and/or one or more of its subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining synchronization component 150 and/or one or more of its subcomponents, and/or data associated therewith, when UE 110 is operating at least one processor 612 to execute synchronization component 150 and/or one or more of its subcomponents.

The transceiver 602 may include at least one receiver 606 and at least one transmitter 608. The receiver 606 may include hardware, firmware, and/or software code executable by a processor for receiving data, the code comprising instructions and being stored in a memory (e.g., computer-readable medium). The receiver 606 may be, for example, a RF receiver. In an aspect, the receiver 606 may receive signals transmitted by at least one base station 105. Additionally, the receiver 606 may process such received signals, and also may obtain measurements of the signals, such as, but not limited to, Ec/Io, SNR, RSRP, RSSI, etc. The transmitter 608 may include hardware, firmware, and/or software code executable by a processor for transmitting data, the code comprising instructions and being stored in a memory (e.g., computer-readable medium). A suitable example of the transmitter 608 may include, but is not limited to, an RF transmitter.

Moreover, in an aspect, the UE 110 may include the RF front end 688, which may operate in communication with one or more antennas 665 and transceiver 602 for receiving and transmitting radio transmissions, for example, wireless communications transmitted by at least one base station 105 or wireless transmissions transmitted by the UE 110. The RF front end 688 may be coupled with one or more antennas 665 and can include one or more low-noise amplifiers (LNAs) 690, one or more switches 692, one or more power amplifiers (PAs) 698, and one or more filters 696 for transmitting and receiving RF signals.

In an aspect, the LNA 690 can amplify a received signal at a desired output level. In an aspect, each LNA 690 may have a specified minimum and maximum gain values. In an aspect, the RF front end 688 may use one or more switches 692 to select a particular LNA 690 and a specified gain value based on a desired gain value for a particular application.

Further, for example, the one or more PA(s) 698 may be used by the RF front end 688 to amplify a signal for an RF output at a desired output power level. In an aspect, each PA 698 may have specified minimum and maximum gain values. In an aspect, the RF front end 688 may use one or more switches 692 to select a particular PA 698 and a corresponding specified gain value based on a desired gain value for a particular application.

Also, for example, the one or more filters 696 can be used by the RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be coupled with a specific LNA 690 and/or PA 698. In an aspect, the RF front end 688 can use one or more switches 692 to select a transmit or receive path using a specified filter 696, LNA 690, and/or PA 698, based on a configuration as specified by transceiver 602 and/or processor 612.

As such, the transceiver 602 may be configured to transmit and receive wireless signals through one or more antennas 665 via the RF front end 688. In an aspect, transceiver 602 may be tuned to operate at specified frequencies such that the UE 110 can communicate with, for example, the one or more base stations 65 or one or more cells associated with one or more base stations 65. In an aspect, for example, the modem 140 can configure the transceiver 602 to operate at a specified frequency and power level based on the UE configuration of the UE 110 and the communication protocol used by the modem 140.

In an aspect, the modem 140 can be a multiband-multi-mode modem, which can process digital data and communicate with the transceiver 602 such that the digital data is sent and received using the transceiver 602. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 7:
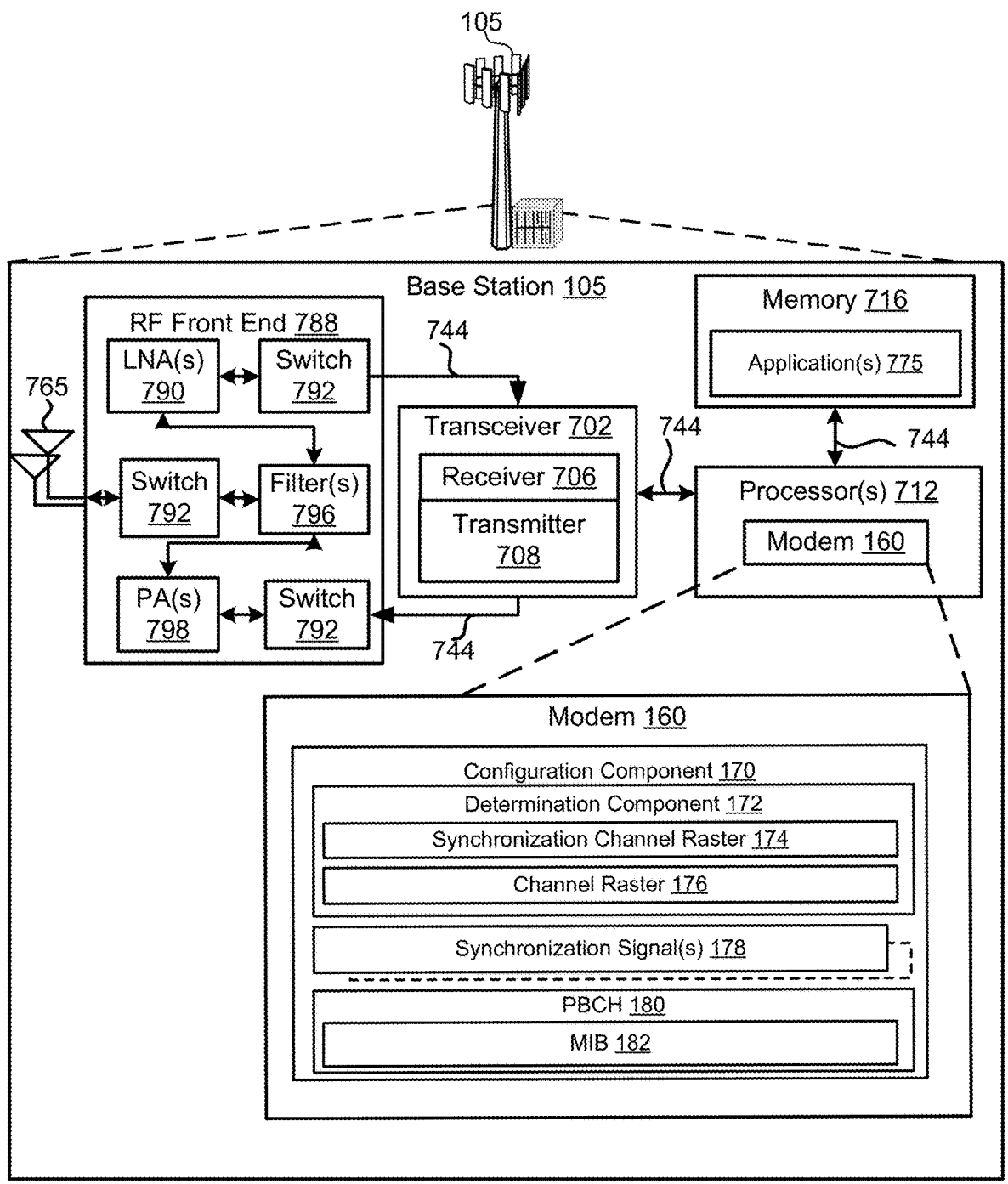
FIG. 7 is a schematic diagram of example components of the base station of FIG. 1.

Referring to FIG. 7, one example of an implementation of base station 105 may include a variety of components, some of which have already been described above, but including components such as one or more processors 712, a memory 716, and a transceiver 702 in communication via one or more buses 744, which may operate in conjunction with the modem 160 and configuration component 170 to enable one or more of the functions described herein.

The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication, comprising:
   determining, at a network entity, a synchronization channel raster corresponding to a set of frequencies; and
   transmitting, from the network entity, one or more synchronization signals and a physical broadcast channel (PBCH) in a frequency of the set of frequencies of the synchronization channel raster to at least one user equipment (UE), wherein a master information block (MIB) of the PBCH includes a first portion of bits indicating a common control subband for carrying minimum system information block (MSIB) scheduling information, wherein the common control subband corresponds to a common search space physical downlink control channel (PDCCH), wherein the MSIB scheduling information includes a location of the common search space PDCCH with respect to the frequency of the set of frequencies of the synchronization channel raster.

2. The method of claim 1, wherein determining the synchronization channel raster further comprises determining the synchronization channel raster based at least on a least common multiple (LCM) of a channel raster and a reference resource block (RB) bandwidth.

3. The method of claim 1, wherein the MSIB scheduling information further includes a bandwidth.

4. The method of claim 1, wherein the MIB includes a second portion of bits indicating a location of a center frequency.

5. A method of wireless communication, comprising:
   detecting, at a user equipment (UE), one or more synchronization signals for timing and frequency synchronization with a network entity and a physical cell identifier (ID) for each frequency of a synchronization channel raster;
   retrieving, at the UE, a master information block (MIB) by decoding a physical broadcast channel (PBCH) transmitted from the network entity, wherein the MIB includes a first portion of bits indicating a common control subband for carrying minimum system information block (MSIB) scheduling information, wherein the common control subband corresponds to a common search space physical downlink control channel (PDCCH), wherein the MSIB scheduling information includes a location of the common search space PDCCH with respect to the synchronization channel raster; and
   searching, by the UE, for a center frequency based at least on detecting the one or more synchronization signals and retrieving the MIB.

6. The method of claim 5, wherein the synchronization channel raster corresponds to a least common multiple (LCM) of a channel raster and a reference resource block (RB) bandwidth.

7. The method of claim 6, wherein the MSIB scheduling information further includes a bandwidth.

8. The method of claim 5, wherein the MIB includes a second portion of bits indicating a location of the center frequency.

9. A method of wireless communication, comprising:
   determining, at a network entity, a synchronization channel raster corresponding to a set of frequencies; and
   transmitting, from the network entity, one or more synchronization signals and a physical broadcast channel (PBCH) in a frequency of the set of frequencies of the synchronization channel raster closest to a center frequency of a bandwidth to at least one user equipment (UE), wherein a first portion of bits of a master information block (MIB) indicate a first location of the center frequency of the bandwidth in relation to a second location of the frequency of the set of frequencies of the synchronization channel raster, and wherein the MIB includes a common control subband for carrying minimum system information block (MSIB) scheduling information, wherein the common control subband corresponds to a common search space physical downlink control channel (PDCCH), wherein the MSIB scheduling information includes a third location of the common search space PDCCH with respect to the frequency of the set of frequencies of the synchronization channel raster.

10. The method of claim 9, wherein determining the synchronization channel raster further comprises determining the synchronization channel raster based at least on a least common multiple (LCM) of a channel raster and a reference resource block (RB) bandwidth.

11. The method of claim 9, wherein the common control subband being symmetrically located to the center frequency of the bandwidth.

12. The method of claim 9, wherein the MIB includes a common control subband bandwidth and a common control subband numerology.

13. The method of claim 9, the common control subband being symmetrically located at any frequency of the bandwidth.

14. The method of claim 13, wherein a second portion of bits of the MIB indicates at least one of a fourth location of the common control subband in relation to the second location of the frequency of the set of frequencies of the synchronization channel raster, a common control subband bandwidth, a common control subband numerology; or any combination thereof.

15. An apparatus for wireless communication, comprising:
    a memory; and
    a processor in communication with the memory, wherein the processor is configured to:
        determine, at a network entity, a synchronization channel raster corresponding to a set of frequencies; and
        transmit, from the network entity, one or more synchronization signals and a physical broadcast channel (PBCH) in a frequency of the set of frequencies of the synchronization channel raster to at least one user equipment (UE), wherein a master information block (MIB) includes a first portion of bits indicating a common control subband for carrying minimum system information block (MSIB) scheduling information, wherein the common control subband corresponds to a common search space physical downlink control channel (PDCCH), wherein the MSIB scheduling information includes a location of the common search space PDCCH with respect to the frequency of the set of frequencies of the synchronization channel raster.

16. The apparatus of claim 15, wherein determining the synchronization channel raster further comprises determining the synchronization channel raster based at least on a least common multiple (LCM) of a channel raster and a reference resource block (RB) bandwidth.

17. The apparatus of claim 15, wherein the MSIB scheduling information further includes a bandwidth.

18. The apparatus of claim 15, wherein the MIB includes a second portion of bits indicating a location of a center frequency.

19. An apparatus for wireless communication, comprising:
    a memory; and
    a processor in communication with the memory, wherein the processor is configured to:
        detect, at a user equipment (UE), one or more synchronization signals for timing and frequency synchronization with a network entity and a physical cell identifier (ID) for each frequency of a synchronization channel raster;
        retrieve, at the UE, a master information block (MIB) by decoding a physical broadcast channel (PBCH) transmitted from the network entity, wherein the MIB includes a first portion of bits indicating a common control subband for carrying minimum system information block (MSIB) scheduling information, wherein the common control subband corresponds to a common search space physical downlink control channel (PDCCH), wherein the MSIB scheduling information includes a location of the common search space PDCCH with respect to the synchronization channel raster; and
        search, by the UE, for a center frequency based at least on detecting the one or more synchronization signals and retrieving the MIB.

20. The apparatus of claim 19, wherein the synchronization channel raster corresponds to a least common multiple (LCM) of a channel raster and a reference resource block (RB) bandwidth.

21. The apparatus of claim 19, wherein the MSIB scheduling information further includes a bandwidth.

22. The apparatus of claim 19, wherein the MIB includes a second portion of bits indicating a location of the center frequency.

23. An apparatus for wireless communication, comprising:
    a memory; and
    a processor in communication with the memory, wherein the processor is configured to:
        determine, at a network entity, a synchronization channel raster corresponding to a set of frequencies; and
        transmit, from the network entity, one or more synchronization signals and a physical broadcast channel (PBCH) in a frequency of the set of frequencies of the synchronization channel raster closest to a center frequency of a bandwidth to at least one user equipment (UE), wherein a first portion of bits of a master information block (MIB) indicate a first location of the center frequency of the bandwidth in relation to a second location of the frequency of the set of frequencies of the synchronization channel raster, and wherein the MIB includes a common control subband for carrying minimum system information block (MSIB) scheduling information, wherein the common control subband corresponds to a common search space physical downlink control channel (PDCCH), wherein the MSIB scheduling information includes a third location of the common search space PDCCH with respect to the frequency of the set of frequencies of the synchronization channel raster.

24. The apparatus of claim 23, wherein determining the synchronization channel raster further comprises determining the synchronization channel raster based at least on a least common multiple (LCM) of a channel raster and a reference resource block (RB) bandwidth.

25. The apparatus of claim 23, wherein the common control subband being symmetrically located to the center frequency of the bandwidth.

26. The apparatus of claim 25, wherein the MIB includes a common control subband bandwidth and a common control subband numerology.

27. The apparatus of claim 23, the common control subband being symmetrically located at any frequency of the bandwidth.

28. The apparatus of claim 27, wherein a second portion of bits of the MIB indicates at least one of a fourth location of the common control subband in relation to the second location of the frequency of the set of frequencies of the synchronization channel raster, a common control subband bandwidth, a common control subband numerology; or any combination thereof.

29. A non-transitory computer-readable medium storing computer code executable for wireless communications, comprising:
  code for determining, at a network entity, a synchronization channel raster corresponding to a set of frequencies; and
  code for transmitting, from the network entity, one or more synchronization signals and a physical broadcast channel (PBCH) in a frequency of the set of frequencies of the synchronization channel raster to at least one user equipment (UE), wherein a master information block (MIB) includes a first portion of bits indicating a common control subband for carrying minimum system information block (MSIB) scheduling information, wherein the common control subband corresponds to a common search space physical downlink control channel (PDCCH), wherein the MSIB scheduling information includes a location of the common search space PDCCH with respect to the frequency of the set of frequencies of the synchronization channel raster.

30. A non-transitory computer-readable medium storing computer code executable for wireless communications, comprising:
  code for detecting, at a user equipment (UE), one or more synchronization signals for a timing and a frequency synchronization with a network entity and a physical cell identifier (ID) for each frequency of a synchronization channel raster;
  code for retrieving, at the UE, a master information block (MIB) by decoding a physical broadcast channel (PBCH) transmitted from the network entity, wherein the MIB includes a first portion of bits indicating a common control subband for carrying minimum system information block (MSIB) scheduling information, wherein the common control subband corresponds to a common search space physical downlink control channel (PDCCH), wherein the MSIB scheduling information includes a location of the common search space PDCCH with respect to the synchronization channel raster; and
  code for searching, by the UE, for a center frequency based at least on detecting the one or more synchronization signals and retrieving the MIB.

31. A non-transitory computer-readable medium storing computer code executable for wireless communications, comprising:
  code for determining, at a network entity, a synchronization channel raster corresponding to a set of frequencies; and
  code for transmitting, from the network entity, one or more synchronization signals and a physical broadcast channel (PBCH) in a frequency of the set of frequencies of the synchronization channel raster closest to a center frequency of a bandwidth to at least one user equipment (UE), wherein a first portion of bits of a master information block (MIB) indicate a first location of the center frequency of the bandwidth in relation to a second location of the frequency of the set of frequencies of the synchronization channel raster, and wherein the MIB includes a common control subband for carrying minimum system information block (MSIB) scheduling information, wherein the common control subband corresponds to a common search space physical downlink control channel (PDCCH), wherein the MSIB scheduling information includes a third location of the common search space PDCCH with respect to the frequency of the set of frequencies of the synchronization channel raster.

32. An apparatus for wireless communication, comprising:
  means for determining, at a network entity, a synchronization channel raster corresponding to a set of frequencies; and
  means for transmitting, from the network entity, one or more synchronization signals and a physical broadcast channel (PBCH) in a frequency of the set of frequencies of the synchronization channel raster to at least one user equipment (UE), wherein a master information block (MIB) includes a first portion of bits indicating a common control subband for carrying minimum system information block (MSIB) scheduling information, wherein the common control subband corresponds to a common search space physical downlink control channel (PDCCH), wherein the MSIB scheduling information includes a location of the common search space PDCCH with respect to the frequency of the set of frequencies of the synchronization channel raster.

33. An apparatus for wireless communication, comprising:
  means for detecting, at a user equipment (UE), one or more synchronization signals for a timing and a frequency synchronization with a network entity and a physical cell identifier (ID) for each frequency of a synchronization channel raster;
  means for retrieving, at the UE, a master information block (MIB) by decoding a physical broadcast channel (PBCH) transmitted from the network entity, wherein the MIB includes a first portion of bits indicating a common control subband for carrying minimum system information block (MSIB) scheduling information, wherein the common control subband corresponds to a common search space physical downlink control channel (PDCCH), wherein the MSIB scheduling information includes a location of the common search space PDCCH with respect to the synchronization channel raster; and
  means for searching, by the UE, for a center frequency based at least on detecting the one or more synchronization signals and retrieving the MIB.

34. An apparatus for wireless communication, comprising:
  means for determining, at a network entity, a synchronization channel raster corresponding to a set of frequencies; and
  means for transmitting, from the network entity, one or more synchronization signals and a physical broadcast channel (PBCH) in a frequency of the set of frequencies of the synchronization channel raster closest to a center frequency of a bandwidth to at least one user equipment (UE), wherein a first portion of bits of a master information block (MIB) indicate a first location of the center frequency of the bandwidth in relation to a second location of the frequency of the set of frequencies of the synchronization channel raster, and wherein the MIB includes a common control subband for carrying minimum system information block (MSIB) scheduling information, wherein the common control subband corresponds to a common search space physical downlink control channel (PDCCH), wherein the MSIB scheduling information includes a third location of the common search space PDCCH with respect to the frequency of the set of frequencies of the synchronization channel raster.

* * * * *